(12) United States Patent
Fantone et al.

(10) Patent No.: US 7,801,425 B2
(45) Date of Patent: Sep. 21, 2010

(54) UNDERWATER ADAPTIVE CAMERA HOUSING

(75) Inventors: Stephen J. Fantone, Lynnfield, MA (US); Stephen D. Fantone, Lynnfield, MA (US); Peter M. Nielsen, Chelsea, MA (US)

(73) Assignee: Optikos Corporation, Wakefield, MA (US)

( * ) Notice: Subject to any disclaimer, the term of this patent is extended or adjusted under 35 U.S.C. 154(b) by 164 days.

(21) Appl. No.: 12/287,766

(22) Filed: Oct. 14, 2008

(65) Prior Publication Data

US 2009/0110380 A1 Apr. 30, 2009

Related U.S. Application Data

(60) Provisional application No. 61/001,012, filed on Oct. 30, 2007.

(51) Int. Cl.
*G03B 17/08* (2006.01)
(52) U.S. Cl. .......................... 396/27; 348/81
(58) Field of Classification Search ............. 396/25–29; 348/81
See application file for complete search history.

(56) References Cited

U.S. PATENT DOCUMENTS

| | | | | |
|---|---|---|---|---|
| 3,019,715 A | * | 2/1962 | Arnold et al. ................. | 396/27 |
| 3,065,666 A | * | 11/1962 | Sampson ..................... | 396/27 |
| 4,860,038 A | | 8/1989 | Thatcher | |
| 5,669,020 A | | 9/1997 | Hopmeyer | |
| 6,349,824 B1 | | 2/2002 | Yamada | |
| 6,466,741 B2 | * | 10/2002 | Uchiyama ..................... | 396/6 |
| 6,819,866 B2 | | 11/2004 | DaSilva | |
| 6,999,322 B1 | | 2/2006 | Lin | |
| 7,679,674 B2 | * | 3/2010 | Nishizawa .................. | 348/376 |
| 2002/0003584 A1 | | 1/2002 | Kossin | |
| 2003/0115010 A1 | | 6/2003 | Estep | |
| 2003/0214593 A1 | | 11/2003 | Takematsu | |
| 2006/0193615 A1 | * | 8/2006 | Funahashi et al. ............. | 396/29 |
| 2007/0071423 A1 | * | 3/2007 | Fantone et al. ................ | 396/27 |

* cited by examiner

*Primary Examiner*—W. B. Perkey
*Assistant Examiner*—Dennis Hancock
(74) *Attorney, Agent, or Firm*—Francis J. Caufield (57) ABSTRACT

An underwater camera housing provided with an adaptive mechanical control arrangement for use with a broad range of camera brands and models. The camera housing is preferably formed of front and rear housing sections that are molded of clear transparent plastic and arranged to be moved between an open position for mounting a camera within the housing and a closed position in which the housing provides a watertight enclosure for protecting and communicating with a camera. The housing is provided with a truncated hemispherical lens through which a camera views scenes to be photographed to reduce distortion and not foreshorten viewing angle and a flat window and optional diffuser for providing controlled artificial illumination to a scene. A mounting plate is structured to slideably fit into one of the housing halves in one of two lateral orientations and includes a slidably adjustable camera mounting plate that permits a user to securely and accurately position cameras side-to-side and for and aft with respect to truncated hemispherical lens. Push button assemblies adjustable in length and point of contact are used to permit a user to adapt them to interact with a variety of camera control actuator architectures.

10 Claims, 10 Drawing Sheets

UNDERWATER ADAPTIVE CAMERA HOUSING

CROSS-REFERENCE TO RELATED APPLICATION

This application claims the benefit of priority from U.S. Provisional Patent Application No. 61/001,012 filed on Oct. 30, 2007 in the name of Stephen J. Fantone, et al. with the title UNDERWATER ADAPTIVE CAMERA HOUSING, the entire contents of which are incorporated herein by reference.

BACKGROUND OF THE INVENTION

This invention in general relates to housings for conventional cameras (film or digital, but primarily digital) and other digital devices with integral photographic capability to be used for underwater applications and, more particularly, to underwater camera housings that are adaptable for use with a wide range of cameras having different user interface architectures.

For a variety of reasons, camera manufacturers do not adhere to any standard layout for the arrangement, function, and operation of the controls that must be used in the course of taking pictures. Digital cameras with added displays and menu driven selections for control of camera functions and picture taking settings introduce additional complexity and diversity. As a consequence, makers of underwater camera housings have been forced to provide designs that match the control requirements of individual camera models. Thus, most underwater camera housings are more or less uniquely designed for specific camera models and will work with no others or, at best, with a narrow range of cameras. The fact that each camera requires a unique underwater housing obviously results in higher prices since there is no opportunity to take advantage of economies of scale. In addition, every time a user acquires a new camera, a corresponding new underwater housing must be purchased to match that camera's control arrangement.

In addition to the problems associated with the need for unique underwater camera housings for every camera, other problems exist with current underwater housings for all cameras. One of these has to do with the optical properties of underwater housings. Typically, a flat window is provided so that the camera taking lens can "see" what a diver intends to photograph. However, the use of flat windows introduces undesirable distortion and narrows the camera's inherent field of view. Moreover, housings with flat transmission windows often cause artificial light from a camera to reflect into the camera where it becomes an unwanted part of the photograph thus degrading its quality.

In view of the many problems associated with known underwater camera housings, it is a primary object of the present invention to provide a universal underwater camera housing that can be used with a large range of commercially available film and digital still and video cameras and other digital devices such as PDAs and cell phones equipped with photographic functionality.

It is another object of the present invention to provide underwater camera housings with improved optics for film and digital photography.

It is still another object of the present invention to provide underwater camera housings having interior features for controlling reflections from camera strobes and the like so that they do not reach a camera's detector or film as stray light.

Other objects of the invention will in part be obvious and will in part appear hereinafter when the following detailed description is read in connection with the appended drawings.

SUMMARY OF THE INVENTION

The present invention relates to an underwater adaptive camera housing for providing a watertight enclosure and common control interface for cameras and the like. The housing preferably includes two or more housing sections that are moveable between an open and a closed position in which a camera of the type described is mounted within an enclosure sealed from exposure to surrounding water. At least one of the sections has a transparent, preferably truncated hemispherical-shaped, picture taking window that permits light to be received by an enclosed camera. A locking arrangement keeps the housing sections from freely opening when in the closed position. An adjustable inner mount secures cameras in the housing at a position in optical alignment with the transparent picture taking window. A second flat window is provided in the housing above the picture taking window for emitting strobe illumination to a scene. An optional diffuser may be mounted outside of the housing forward of the illumination window to control the pattern of illumination over the scene. Push button assemblies adjustable in length and point of contact are provided to permit the camera housing to be used with a wide variety of commercially available cameras.

In one aspect of the invention, the transparent picture taking window's preferably truncated hemispherical shape operates to prevent back reflection from internal illumination sources, reduces distortion, increases field of view, and accommodates a variety of different sized and shaped cameras.

BRIEF DESCRIPTION OF THE DRAWINGS

The structure, operation, and methodology of the invention, together with other objects and advantages thereof, may best be understood by reading the detailed description in connection with the drawings in which each part has an assigned numeral that identifies it wherever it appears in the various drawings and wherein.

DETAILED DESCRIPTION

The present invention relates to an underwater camera housing having an adjustable mechanical control interface to adapt it for use with a broad range of camera brands and models. The cameras may be conventional still and video film cameras, digital still and video cameras, or digital devices provided with photographic capability, such as cell phones or PDAs having integrated digital cameras.

Figure 1A:
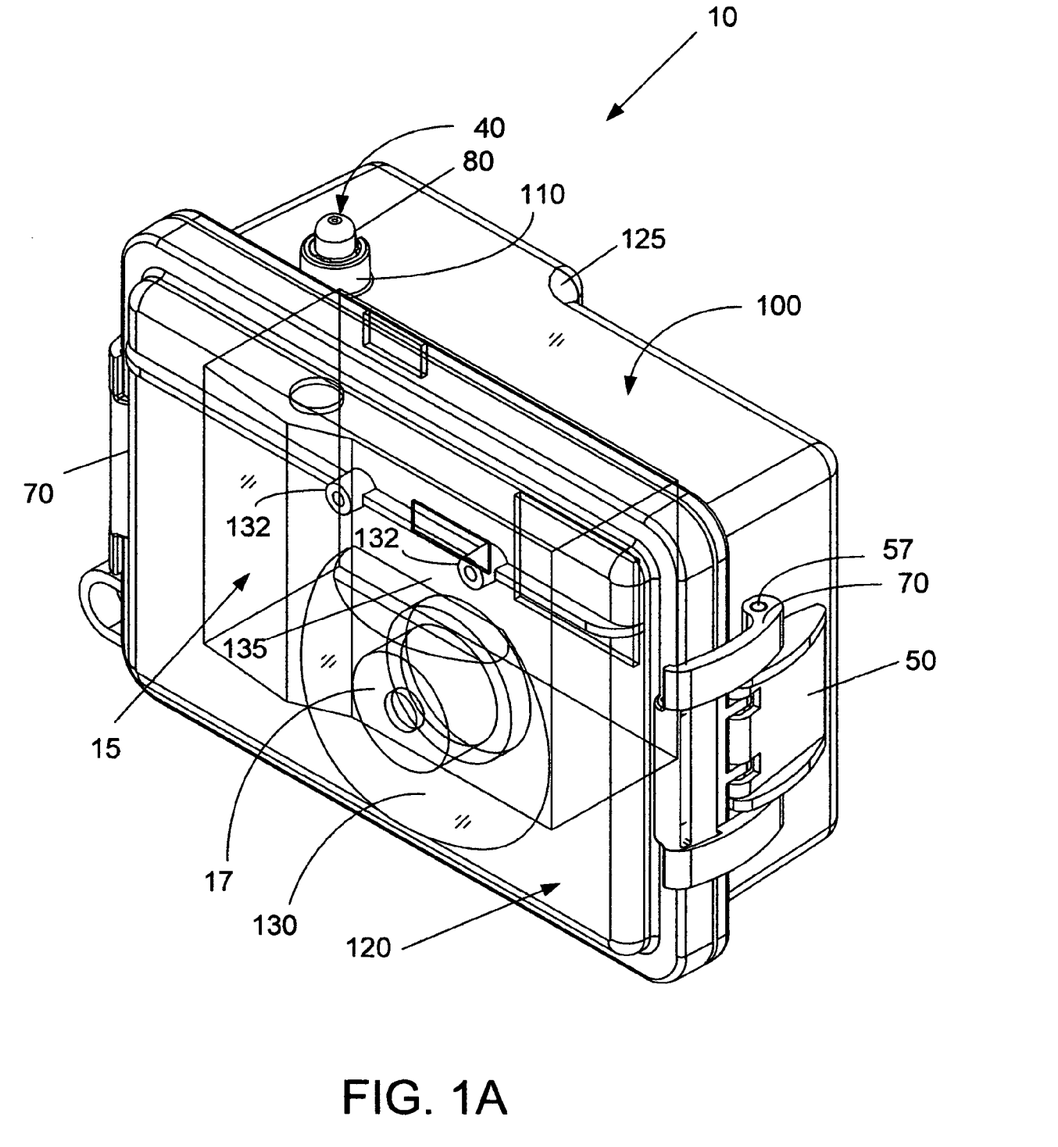
FIG. 1A is a diagrammatic view of an underwater camera housing in accordance with the invention along with an enclosed camera, looking down at them from an upper front right corner perspective.
Figure 1B:
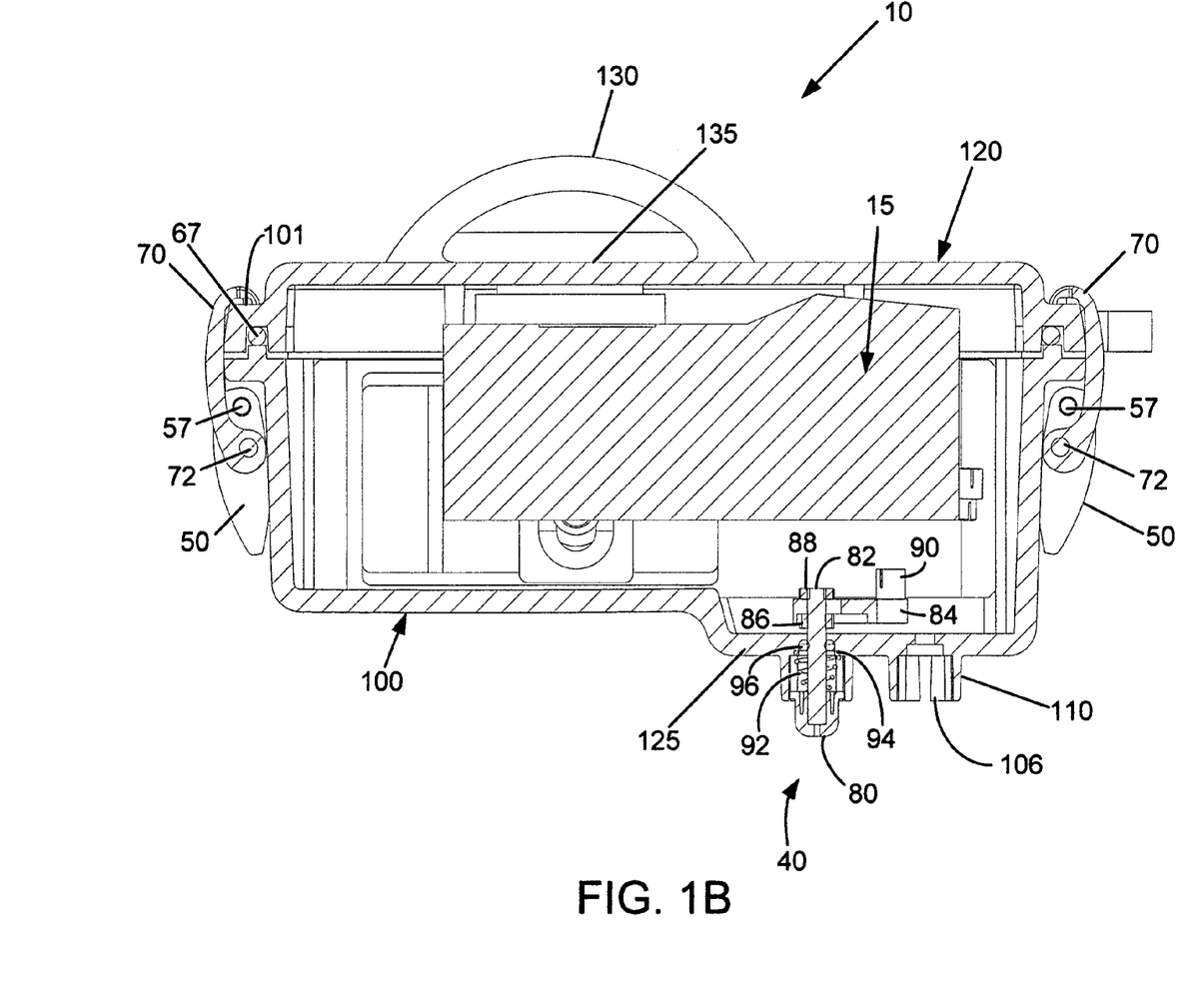
FIG. 1B is a diagrammatic top view of the camera housing of FIG. 1.
Figure 2:
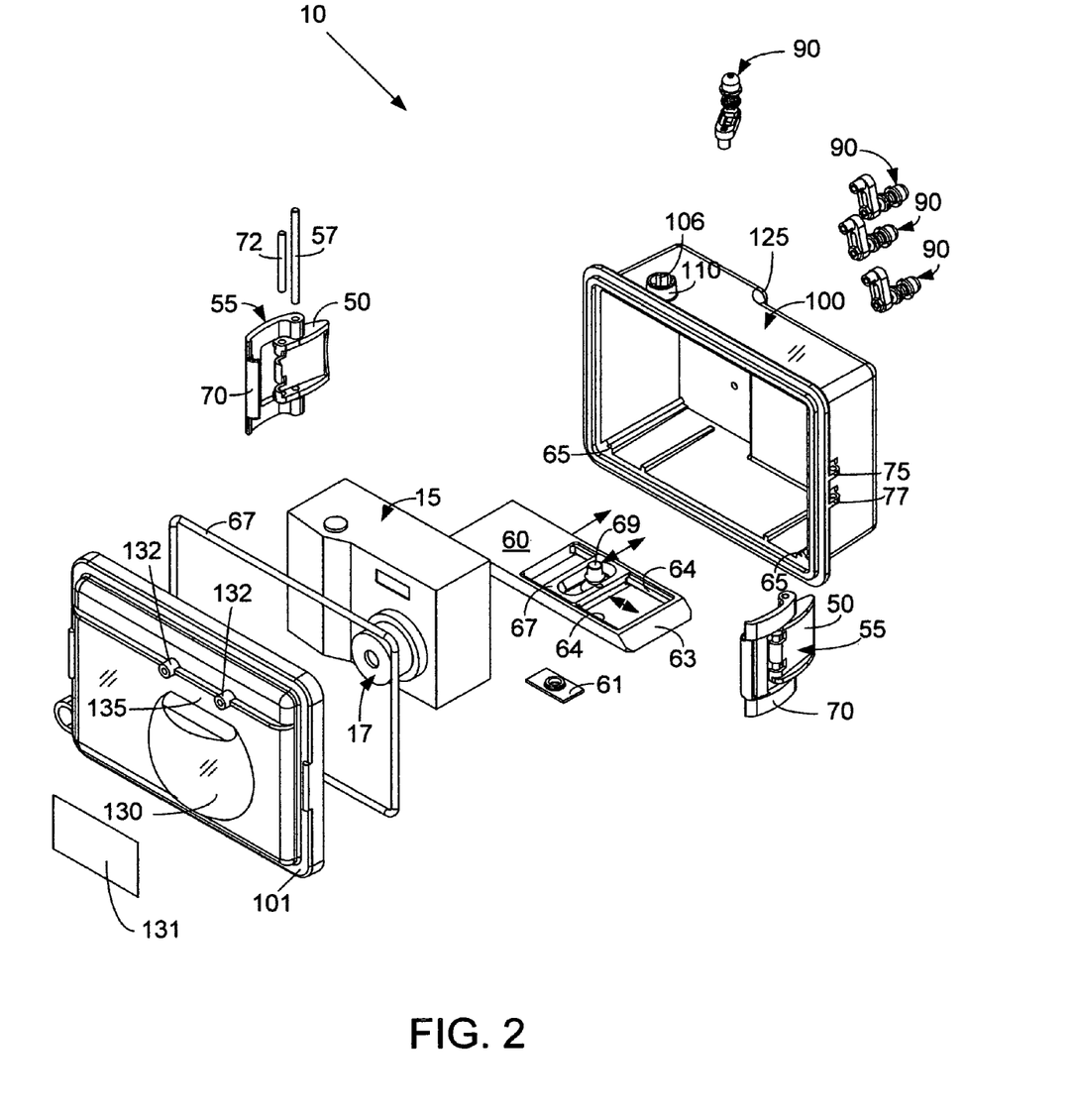
FIG. 2 is an exploded diagrammatic perspective view of the housing camera and of FIG. 1.

Reference is now made to FIGS. 1A, 1B, 2 and 3, which show an adaptive underwater camera housing, generally designated at 10, in accordance with the invention, along with a digital camera 15 located inside of housing 10. These figures show, respectively, an upper right front perspective view, a diagrammatic top view, an exploded perspective view, and an upper-rear perspective view of the inventive underwater housing 10 including its control features where FIG. 2 is an exploded perspective view of FIG. 1. As seen in those figures, underwater housing 10 comprises rear and front housing sections, 100 and 120, respectively, that are adapted to mate in complementary fashion to form a watertight enclosure for accommodating one of many still or video cameras available in the marketplace, including those of the major brands. Housing sections 100 and 120 are preferably injection molded of an optically clear engineering plastic such as acrylic (index of refraction of 1.492) or polycarbonate (n=1.585).

Camera 15 is secured within housing 10 by a mounting mechanism which allows the position of a camera to be adjusted so that its taking lens 17 is aligned in X, Y, and Z with respect to a truncated hemispherical shaped lens window 130. As seen in FIG. 2, camera 15 is fixedly attached and screwed tight to a slotted mounting plate 60 via its tripod interface 69 (See FIG. 2). As described more fully hereinafter, the mounting mechanism in one embodiment includes the mounting plate 60 and a sliding truck 67 (shown in FIG. 2) which insert in rear camera housing 100 for placement of camera 15 along the Z-direction (optical axis), and perpendicular to it (X, and Y directions).

Figure 4:
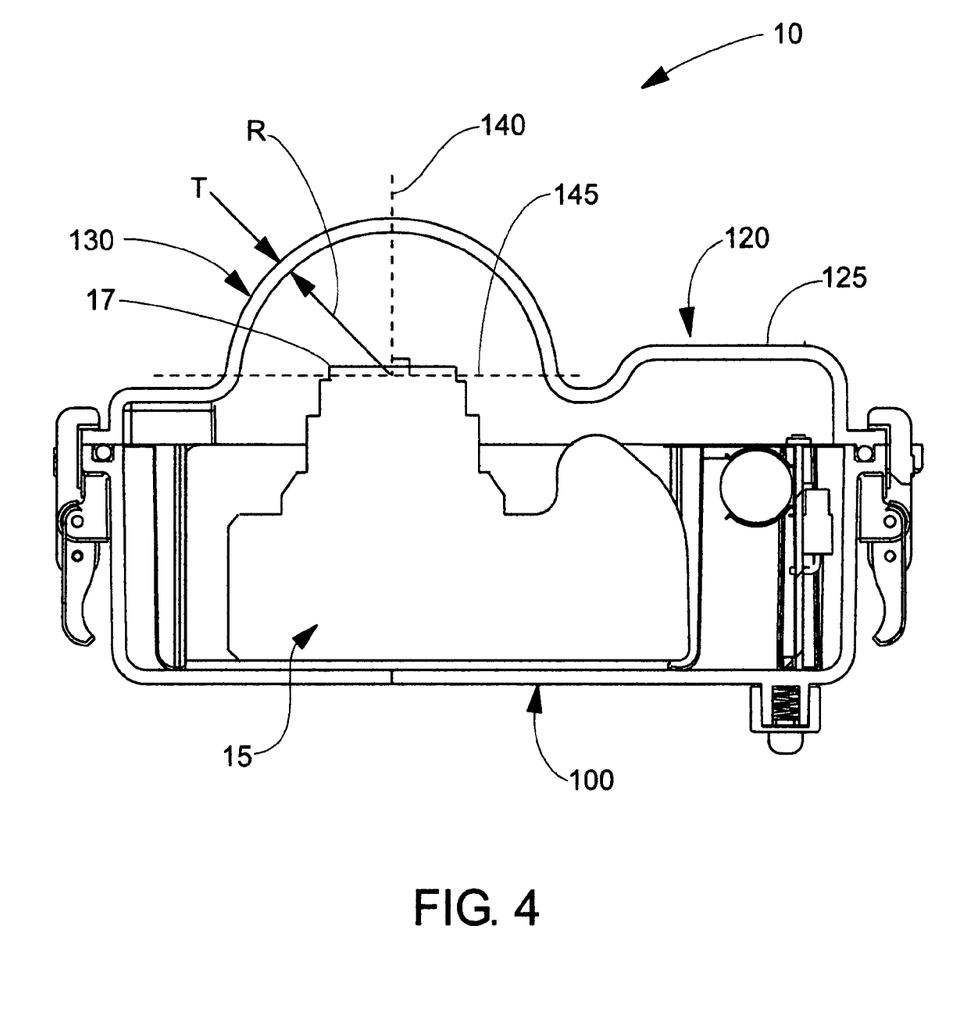
FIG. 4 is simplified diagrammatic top view of the camera and underwater housing of FIG. 1 illustrating various optical features.

As explained further with reference to FIG. 4, truncated hemispherical shaped lens taking window 130 reduces distortion and controls the disposition of back reflections that would otherwise occur when light from internal light sources reflect off interior housing features. If not controlled by the use of the generally hemispherical window, such reflections could otherwise reflect into taking lens 17 where they could ultimately strike a camera's film or detector as unwanted stray radiation that would reduce the quality of the image As shown in FIGS. 1A and 2, front housing section 120 has a vertically extending flat window 135 sitting just above the shelf that truncates otherwise hemispherical taking window 130. The flat window 135 aligns with a camera's strobe to provide artificial light for illuminating a scene to be imaged. However, because the strobe window 135 is flat, it reduces the angular field of illumination of strobes so an optional diffuser 131 may be provided to control the illumination pattern and mitigate against any shadowing caused by the housing itself and any internal baffles. In this connection also, an internal baffle (not shown) may be provided underneath the shelf of the truncated hemispherical taking lens window 130 to prevent light from a strobe or the like from entering the truncated hemispherical taking lens window and thus entering a camera's taking lens as unwanted radiation. The optional internal baffle may be made of opaque flocking or mylar material and held in place with nubs or adhesive. Optional diffuser 131, when used, is designed so that it controls the pattern of illumination provided to match the taking field of the camera and is adjusted for parallax effects. To achieve this, optional diffuser 131 is preferably provided with a series of 90-degree elongated grooves that are normally horizontally oriented to control illumination up and down. Diffuser 131 mounts to the exterior surface of front housing section 120 via a pair of cylindrically shaped, forwardly extending bosses 132.

Because it is transparent, the rear wall of rear housing section 100 acts as a window so that visual displays (e.g., menus, picture previews, etc.) of information located at the rear of camera 15 may be seen when a camera is inside housing 10. Rear housing section 100 also has a bumped out section 125 that serves as a handle for gripping and manipulating housing 10 while being used underwater or otherwise being handled or transported. A lanyard may also be attached to housing 10 for transporting it underwater without physically gripping it by hand.

Referring again to FIG. 2, it can be seen that rear and front housing sections, 100 and 120, respectively, are mated with an intervening watertight O-ring 67 and are held together in the closed mated position by left and right side locking mechanisms, each designated generally at 55. Locking mechanisms 55 are pivotally attached to back housing section 100, and each have levers 50 for locking the housing sections in their mated closed position and for releasing them for opening. Levers 50 rotate about corresponding shafts 72 drawn through upper and lower cantilevered tabs 75 and 77 (shown in FIG. 2). Pivotally connected to levers 50 via longer shafts 57 are latch sections 70 that are configured to grip a rim 101 partially surrounding front housing section 120. The various parts forming the latch mechanism are configured and arranged to provide an over-the-center arrangement to clamp shut and release front housing section 120 against rear housing section 100 while compressing intervening O-ring 67 to provide a seal between them.

In a variant of the clamping arrangement above, the sections of housing 10 can be semi-permanently sealed with the use of RTV or the like.

Figure 3:
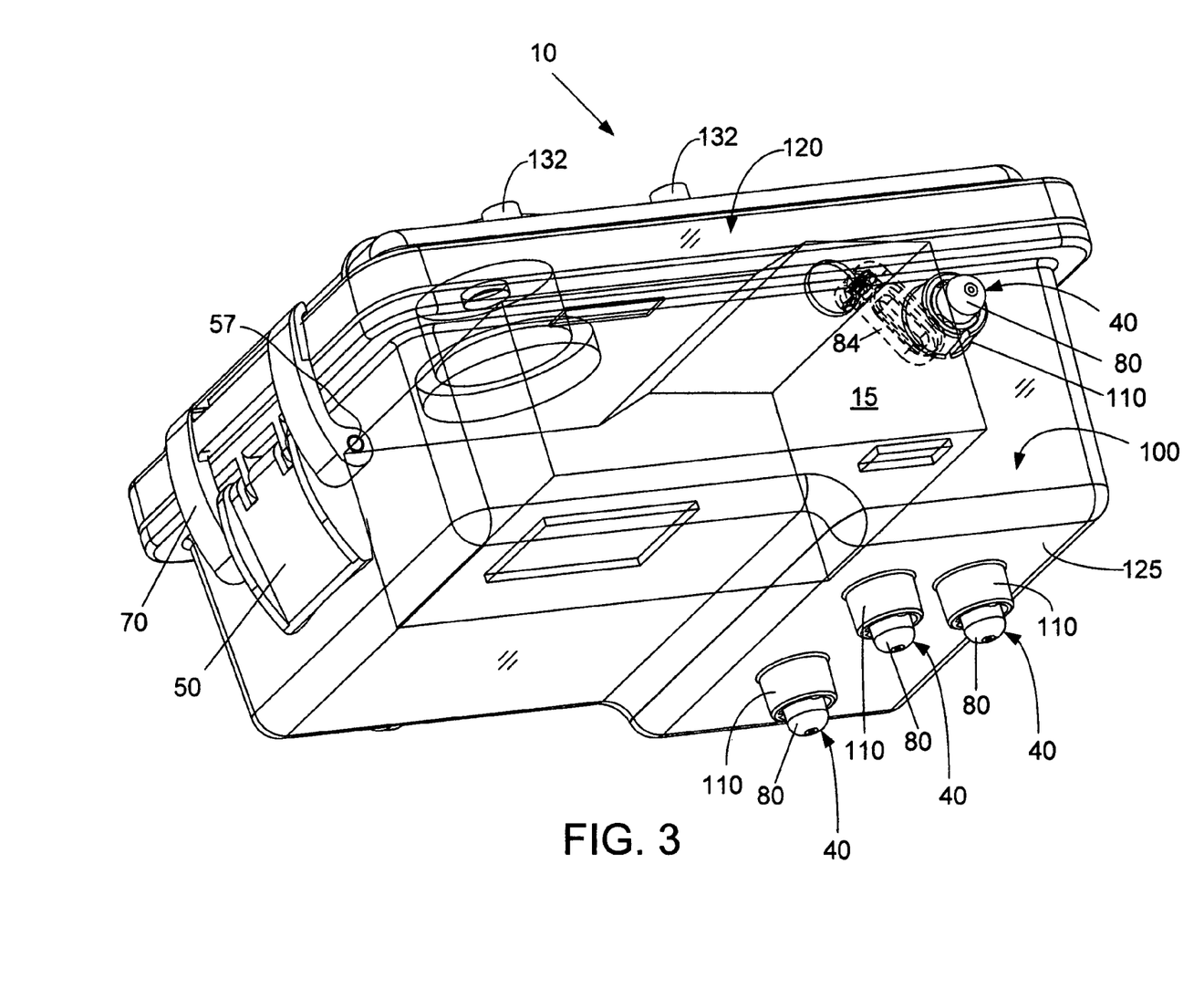
FIG. 3 is a diagrammatic view of the underwater housing and camera of FIG. 1 looking at them from an upper rear left corner perspective.

As seen in FIG. 3, the controls of camera 15 are actuatable from the outside of camera housing 10 via a mechanical push button interface comprising an array of adaptable push button assemblies, designated generally at 40, located on bumped out section 125 of rear housing section 100 and a single push button assembly, also 40, sitting atop camera front housing section 120. Adaptable push button assemblies 40 are, in a manner to be described, adjustable in length and point of contact to permit a user to adapt them to interact with a variety of camera control actuators. The features of push button assemblies 40 that provide their manner of adaptability while preserving the water tightness of camera housing 10 will be described in more detail hereinafter in connection with FIGS. 7A, B, and C.

Figure 5A:
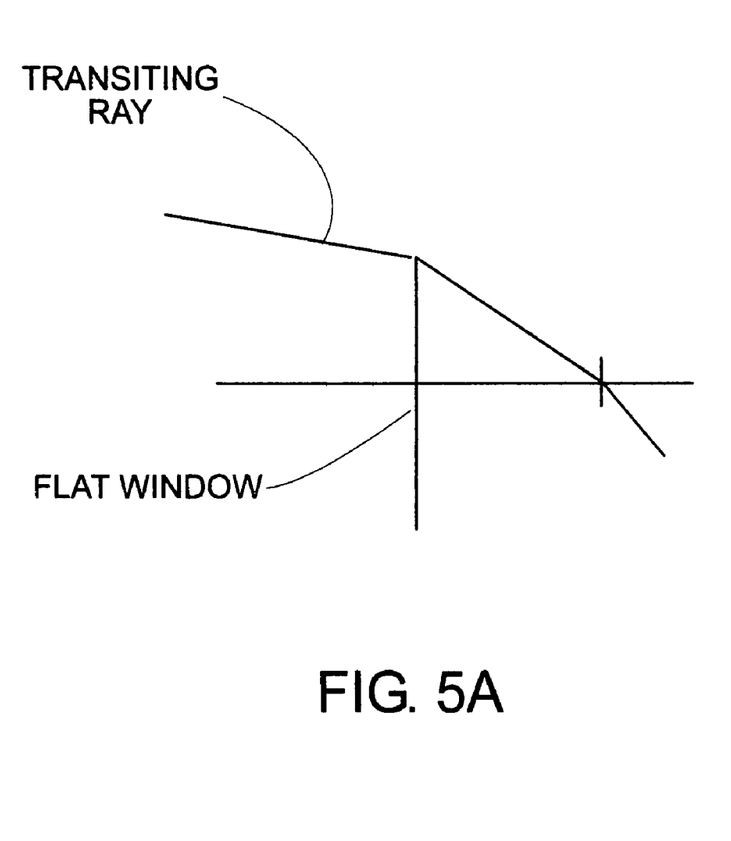
FIGS. 5A and 5B are diagrams showing the differences in field of view between a flat camera window versus the truncated hemispherical lens window of the invention.
Figure 5B:
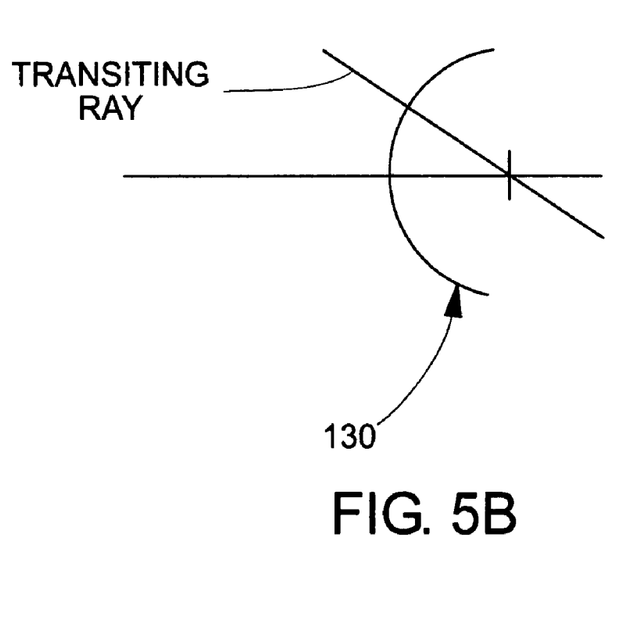
Figure 6A:
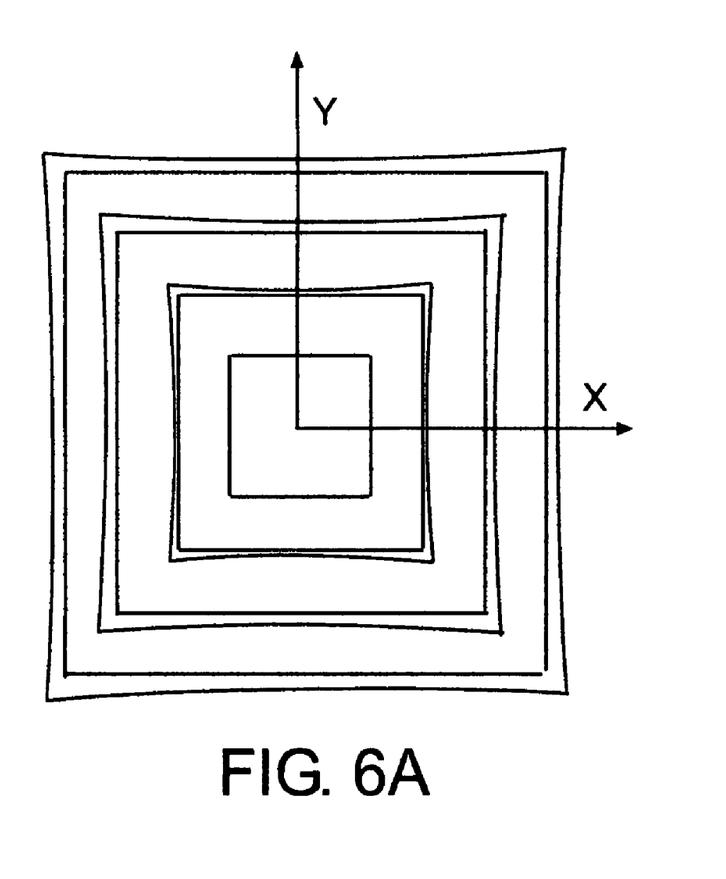
FIGS. 6A and 6B are plots of differences in distortion for a flat camera window versus the truncated hemispherical lens window of the invention.
Figure 6B:
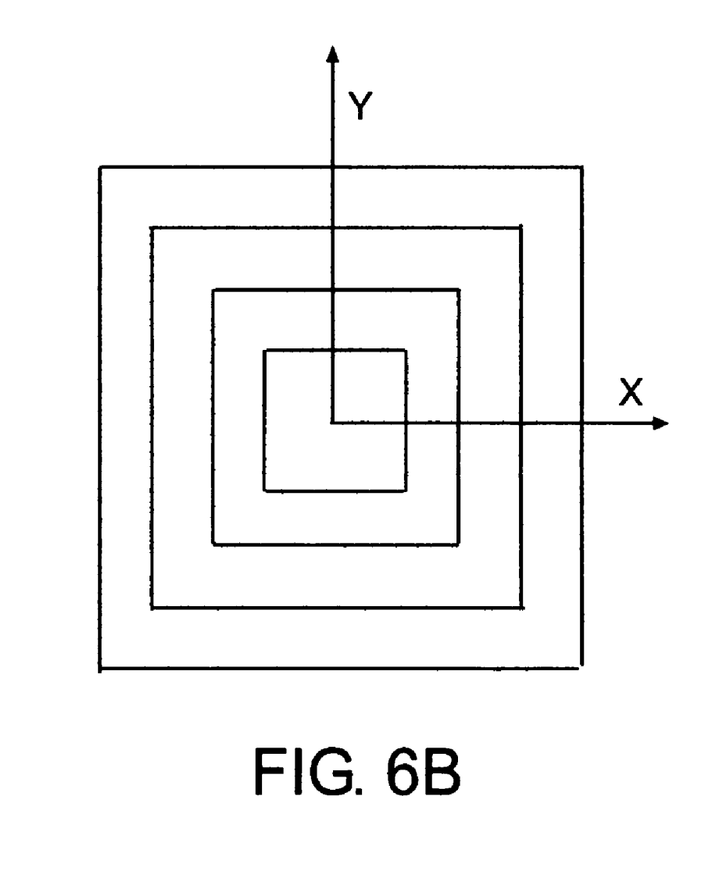

Reference is now made to FIG. 4 once again where the optical features of front housing section 120 are shown. As mentioned earlier, the transparent taking window 130 through which the camera taking lens views a scene is made hemispherical to reduce distortion and maintain a camera's angular field compared with what it would otherwise be using a flat taking window. This can be appreciated by referring now to FIGS. 5A and 5B which show, respectively, the path of a ray of light as it transits a flat window in an air-water interface as opposed to the path of the same ray transiting the truncated hemispherical taking window of the present embodiment. As can be seen, rays transiting the interface through the hemispherical window do not change direction and hence field of view is unaltered, whereas with a flat window, it is reduced. FIGS. 6A and 6B show, correspondingly, a map of distortion on an image from a flat shaped window (FIG. 6A) and that from a hemispherical taking window. Clearly, FIG. 6B demonstrates that the use of the hemispherical window of the invention substantially eliminates distortion while beneficially not foreshortening the angular field of view of a camera's taking lens. The radius of curvature of hemispherically shaped taking window 130 is preferably otherwise designed to accommodate the full focusing range of a large group of cameras operating in their tele, wide angle, and macro modes over their full zoom range. The range over which the radius can sensibly vary is from approximately 1.0 inches to 6.0 inches. The wall thickness of the camera housing is approximately 0.125 inches.

Referring back to FIG. 4, the camera taking lens 17 and optical axis 140 of the hemispherical window are nominally coincident with the entrance pupil of the taking lens 17. The taking lens entrance pupil preferably nominally resides in a plane 145 perpendicular to those optical axes and passing through the entrance pupil center. The hemispherical window 130 is preferably of uniform thickness. One exemplary design having a focal length of −8.4 inches is made of polycarbonate with a radius of three inches and a thickness of 0.125 inches. Given this design, the requirements for bore sighting a camera with respect to the optical axis of the hemispherical window and the placement of its lens entrance pupil along the optical axis are relatively relaxed; it being estimated that the placement of the entrance pupil along the optical axis can be off by +/− an inch before distortion similar to that produced by a flat window would begin to appear.

In addition to the benefits of low distortion, wide angular field of view, and relative insensitivity to camera placement, the hemispherical lens also permits reflections off it from off-axis illumination from the camera, such as built-in strobes, to be beneficially directed to the interior of the camera housing where it is not seen by the camera taking lens. This is possible because such strobes nominally reside in the vicinity of a plane located near the center of curvature of the hemispherical window, and thus light from them is directed to locations where it does not enter the taking lens as unwanted stray radiation that can affect image quality.

Reference is now made again to FIG. 2, which shows the mechanical arrangement previously mentioned for mounting and holding a camera in alignment with the hemispherical shaped window 130 formed in the front camera housing 120. Here, camera mounting plate 60 is seen to be provided with a pair of spaced apart parallel slots 64 and a pair of spaced apart wedged ends 63 (only one shown). The spaced apart wedged ends 63 slide within a corresponding pair of complementary shaped, spaced apart grooved rails 65 located in rear housing section 100. A truck 67 slides within spaced apart parallel slots 64. A camera is secured to the truck 67 via a standard ¼-20 bolt 69 that screws to an underlying plate 61 that is adjustable fore and aft. As can also be seen, the plate aperture is bilaterally symmetric so that the plate 60 can be flipped right to left to place its aperture either to the right of left of rear camera housing 100. This latter feature, in combination with the sliding truck 67, permits the proper side to side and fore and aft location of the camera taking lens to be achieved thus permitting a camera 15 to be positioned side-to-side and fore and aft with respect to the hemispherical window 130. Once fixed to the plate 60, the camera can be slid into rear housing section 100 by placing the wedged ends 63 in the grooved rails 65 and sliding plate 60 along with an attached camera until seated in rear housing section 100. Vertical alignment can be adjusted, as needed, by the use of spacers or shims that sit atop sliding truck 67. Once in position, front housing section 120, when mated with rear housing section 100, traps plate 60 between the two to secure a camera in housing 10. Those skilled in the art will appreciate that the market can be surveyed to determine optimal dimensions so that the underwater housing 10 can accommodate a large segment of available cameras.

Figure 7A:
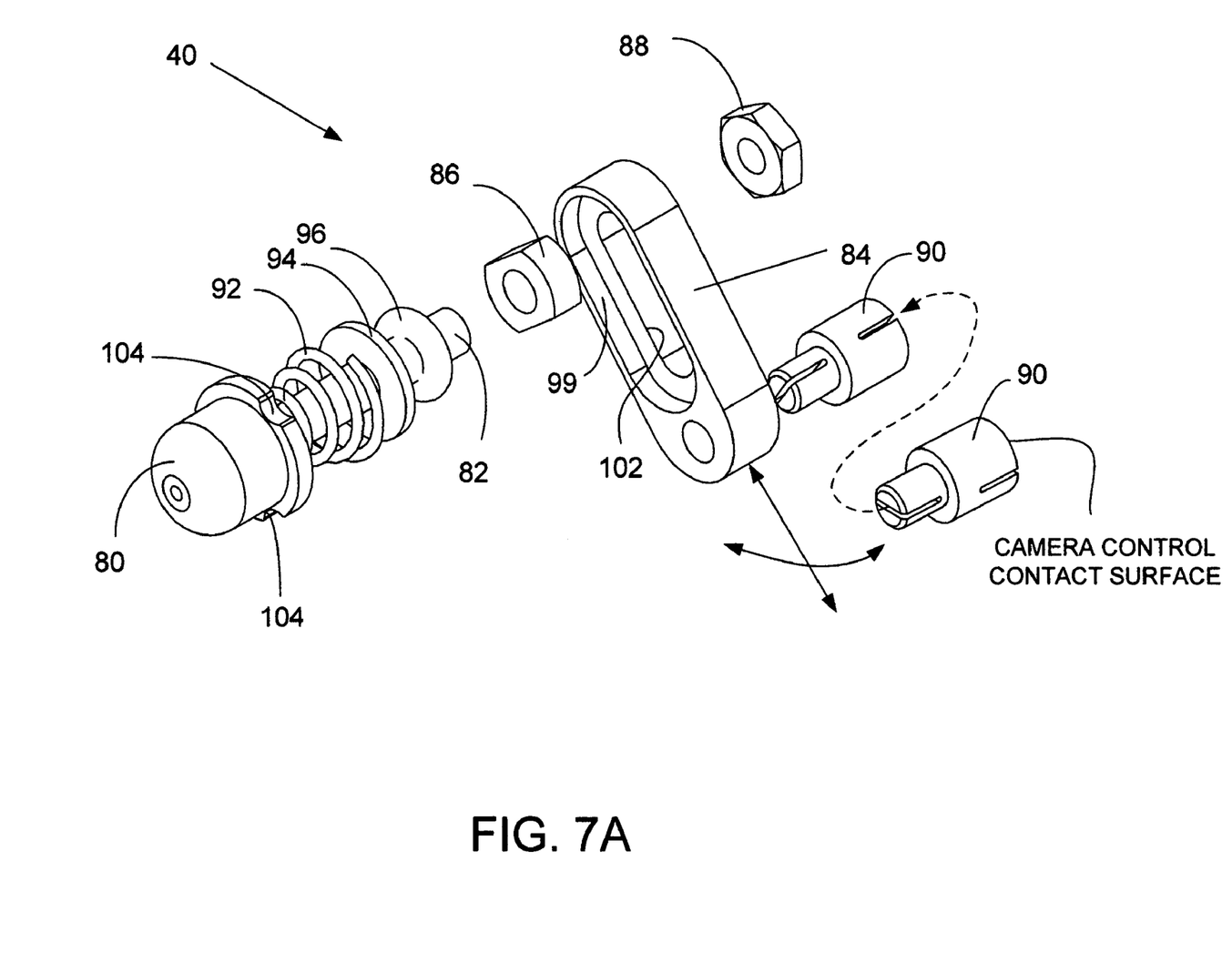
FIG. 7A is an exploded diagrammatic perspective view of an adaptable camera actuator assembly adjustable in length and point of application within the camera housing of FIG. 1.
Figure 7B:
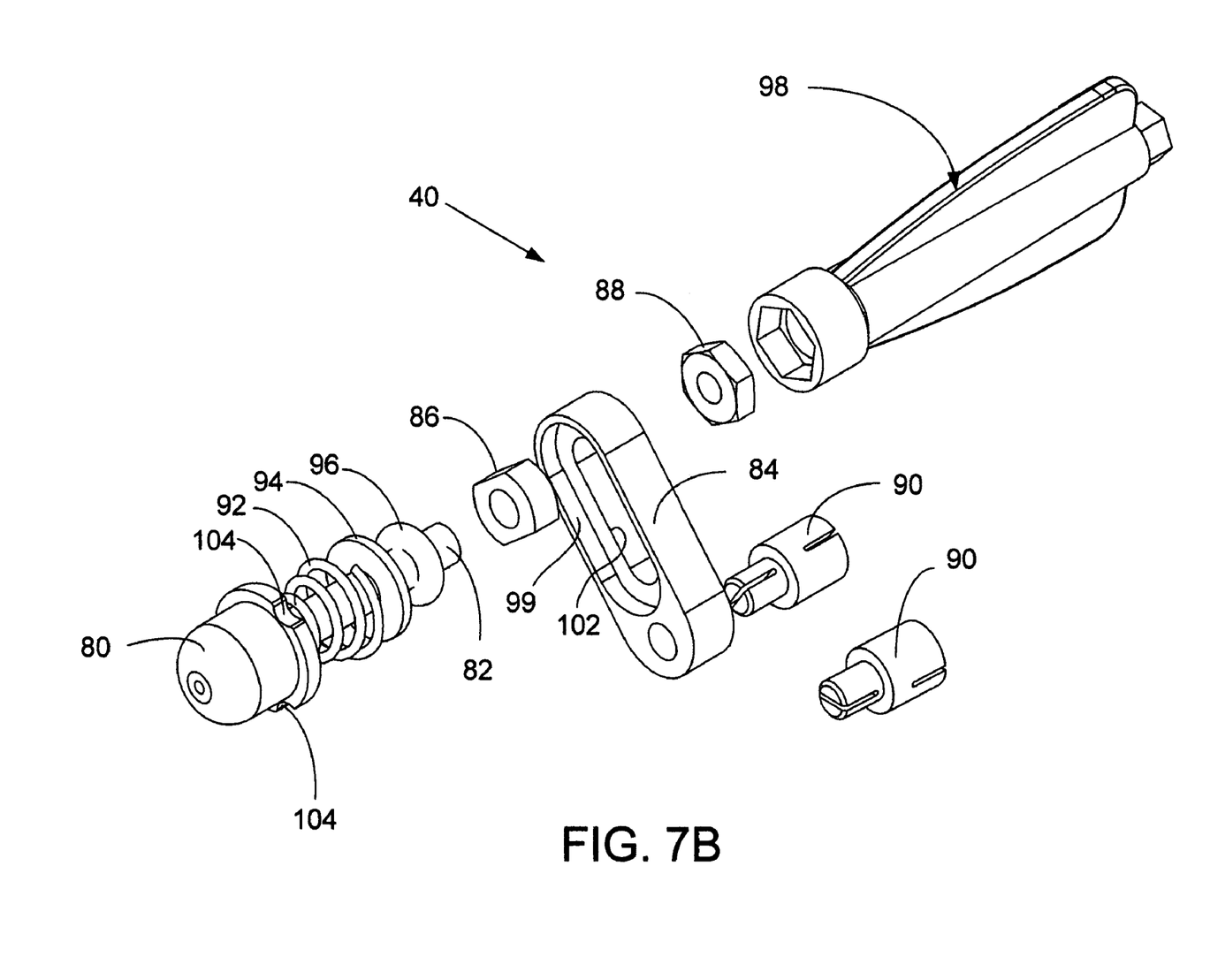
FIG. 7B is an exploded diagrammatic perspective view of the adaptable camera actuator assembly of FIG. 7A shown in conjunction with a separately supplied assembly tool.
Figure 7C:
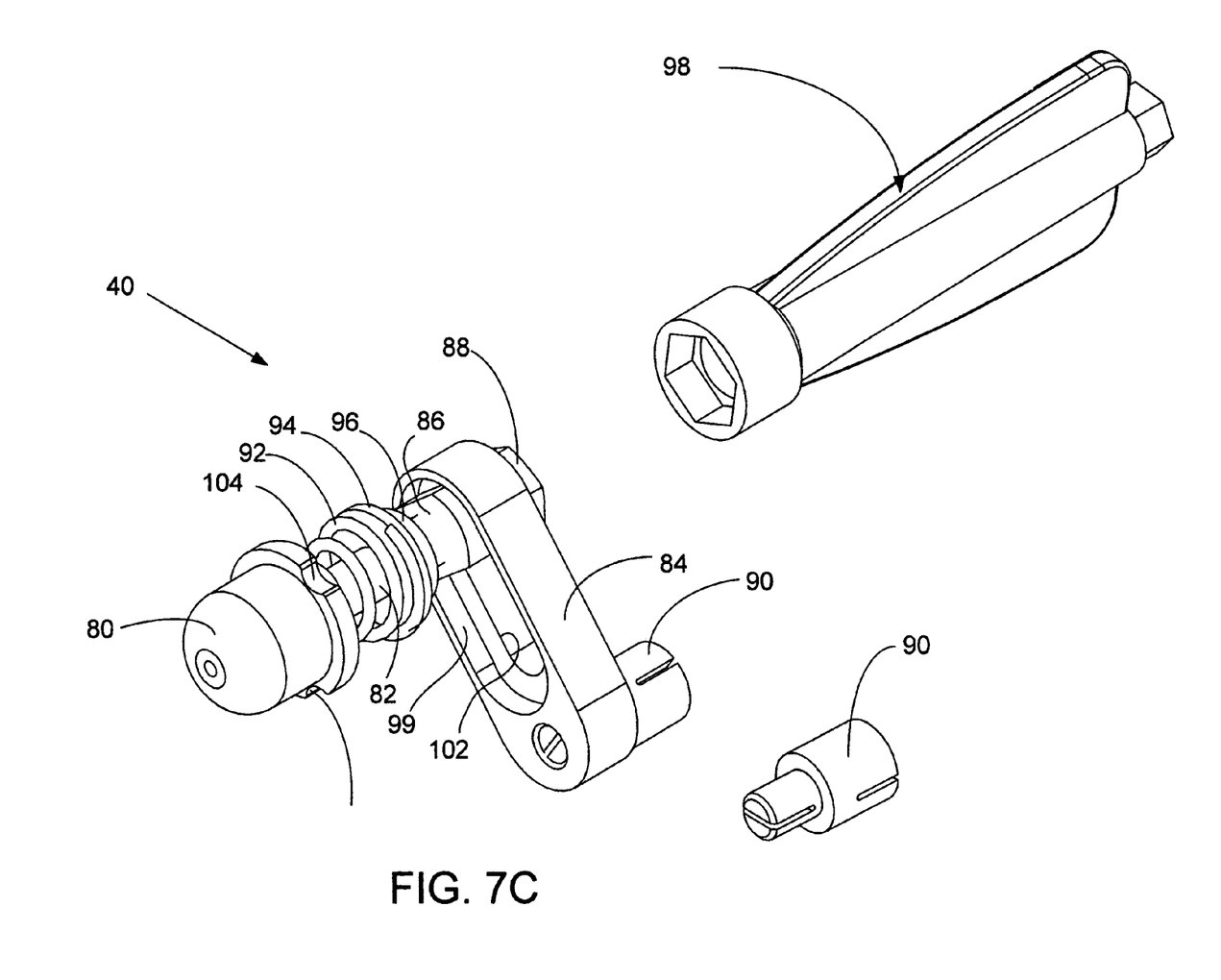
FIG. 7C is an assembled diagrammatic perspective view of the adaptable camera actuator assembly of FIG. 7A shown in conjunction with the separately supplied assembly tool and an unattached length extension member.

Reference is now made to FIGS. 7A, 7B, and 7C, which show unassembled and assembled diagrammatic exploded views of the adjustable push button assembly 40 by which a variety of cameras having different actuator architectures can be operated underwater. To achieve this, each push button assembly is partially assembled to provide a water tight linear motion by actuation from the outside of the camera housing and afterwards finally adjucted by a user so that the linear motion is directed to a particular camera control. This is achieved through the use of a sliding arm adjustable in radial position and angle with respect to a fixed shaft along which the linear motion is first made. An extension at the end of the adjustable slider actually make final contact with a camera control and the length of extension may also be changed as needed. As will be appreciated, such actuators are for functions including turning camera power on and off, picture taking, zooming, previewing, and others.

As seen in FIG. 7A, each adjustable push button assembly 40 comprises a push button 80 integrally molded with a shaft 82, the end of which is threaded to receive a keeper 86 and a nut 88. Located along the shaft 82 is a compression spring 92, a retention washer 94 and an O-ring 96. Compression spring 92, washer 94 and O-ring 96 reside outside of camera housing 10. O-rings 96 are placed in annular grooves provided in the bottom of raised pedestals 110 integrally molded into camera housing sections 100 and 120 (See FIG. 1B). Compression spring 92 and washer 94 are first placed over shaft 82 which is then pushed through a hole provided in the camera housing section (See FIG. 1B) after which the keeper is screwed to it to hold in place. In this connection, push button 80 has three spaced apart (120-degrees) vertically extending slots 104 that fit over correspondingly configured retention ribs 106 (See FIG. 1B) radially protruding into the interior of each pedestal 110 to prevent shaft 82 from rotating once pushed through a camera housing section. The dimensions of the various parts of the assembly are selected, however, so that, when a push button is depressed by a user, a predetermined throw distance is achieved.

Referring now back to FIG. 7A, there can be seen a slotted arm 84 having a recessed groove 99 at the bottom of which is provided an elongated slot 102. Keeper 86 fits inside of groove 99 while the remainder of threaded push rod 82 passes through elongated slot 102 where it is accessible to have nut 88 attached to it. Thus, the active length and angular position of arm 84 can be adjusted with respect to the axis of push shaft 82 by rotating it around shaft 82 after which it can be locked in place by tightening nut 88. One or more camera button contact members 90 are pressed into the end of arm 84 to provide correct length in combination with the predetermined throw distance. In this connection, a separate adjusting tool 98 is provided to tighten nut 88. Adjusting tool 98 may also be used to tighten the ¼-20 camera mounting bolt shown in FIG. 2.

The throw length of the assembly 40 along with the length of the camera button contact members 90 are selected to accommodate the largest range of camera actuator button locations. This adjustment feature, along with the adjustability in the angular and radial position of the slidable arm 84, makes it possible to reach the largest number of camera control locations for a wide range of commercially available cameras.

Having described the invention with respect to specific embodiments, variations of it will be apparent to those skilled in the art based on its teachings. For example, camera contact button contact members 90 may be provided in different lengths. Consequently, such variations are intended to be within the scope covered by the appended claims.

What is claimed is:

1. An underwater adaptive camera housing for providing a watertight enclosure and common control interface for cameras of the type configured to use a standardized protocol for electronically sending and receiving commands and/or data, said underwater adaptive housing comprising:

a watertight enclosure for a camera, said watertight enclosure having at least one transparent window for transmitting light to a camera and an inner mount for physically securing a camera in a predetermined relationship with respect to said at least one transparent window; and a mechanical interface arrangement comprising a plurality of push button assemblies adapted to be actuated by a user from the exterior of said camera housing to operate a camera and adjustable in length and point of contact prior to closing said camera housing to permit a user to adapt said camera housing to a wide range of commercially available cameras.

2. The underwater adaptive camera housing of claim 1 wherein said watertight enclosure is formed of a plurality of camera housing sections adapted to be moveable between open and closed positions to provide said watertight enclosure for a camera when in said closed position.

3. The underwater adaptive camera housing of claim 2 further including a locking arrangement for holding said camera housing sections in said closed position.

4. The underwater adaptive camera housing of claim 3 wherein said locking arrangement comprises a pair of over-the-center latches mounted on opposed sides of said housing.

5. The underwater adaptive camera housing of claim 1 wherein a portion of said transparent window is dome-shaped.

6. The underwater adaptive camera housing of claim 5 wherein said watertight enclosure further includes an inner mount for physically securing a camera within said watertight enclosure in a predetermined relationship with respect to said at least one transparent window.

7. The underwater adaptive camera housing of claim 6 wherein said transparent window is a truncated hemisphere in shape and wherein said inner mount is configured to align the optical axis of a camera with the optical axis of said truncated hemispherical window and to place the entrance pupil of a camera's taking lens approximately at the radius of curvature of said truncated hemispherical transparent window.

8. The underwater adaptive camera housing of claim 1 wherein said mechanical interface arrangement is adapted for actuating one or more of the following camera functions: shutter, zoom-in, zoom-out, review/wake camera, scroll images, manual operation, automatic exposure operation, transfer image data, and delete image.

9. The underwater adaptive camera housing of claim 1 wherein one of said camera housing sections includes a transparent window for viewing camera display screens so that pictures and camera menus can be viewed.

10. The underwater adaptive camera housing of claim 1 wherein each of said plurality of push button assemblies comprises a push rod capable of only linear motion toward a camera within said camera housing and with slidably attached arm adjustable in radial length and angular position with respect to the axis of said push rod to align with a camera control, and a linear extension adjustable in length to reach a camera actuator at a predetermined point of contact.

\* \* \* \* \*